(12) United States Patent
Denz et al.

(10) Patent No.: US 6,431,145 B1
(45) Date of Patent: Aug. 13, 2002

(54) IGNITION CONTROL DEVICE AND METHOD

(75) Inventors: Helmut Denz, Stuttgart; Martin Haussmann, Sachsenheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,462

(22) PCT Filed: Oct. 26, 1999

(86) PCT No.: PCT/DE99/03410

§ 371 (c)(1),
(2), (4) Date: Nov. 30, 2000

(87) PCT Pub. No.: WO00/49290

PCT Pub. Date: Aug. 24, 2000

(30) Foreign Application Priority Data

Feb. 16, 1999 (DE) .......................... 199 06 390

(51) Int. Cl.⁷ ............................. F02P 3/045; F02P 5/145
(52) U.S. Cl. .................................. 123/406.24; 123/609
(58) Field of Search ....................... 123/406.24, 406.25, 123/609, 611, 406.5, 406.51

(56) References Cited

U.S. PATENT DOCUMENTS

| | | | | |
|---|---|---|---|---|
| 5,007,397 A | * | 4/1991 | Akasu | 123/422 |
| 5,269,274 A | | 12/1993 | Koelle et al. | 123/414 |
| 5,816,218 A | | 10/1998 | Motose et al. | 123/414 |
| 5,829,410 A | * | 11/1998 | Hirose | 123/421 |
| 6,234,145 B1 | * | 6/2000 | Shomura | 123/406.24 |

FOREIGN PATENT DOCUMENTS

| | | |
|---|---|---|
| DE | 41 25 677 | 2/1993 |
| JP | 54 158 531 | 12/1979 |
| JP | 62 214 270 | 9/1987 |

\* cited by examiner

*Primary Examiner*—Andrew M. Dolinar
*Assistant Examiner*—Johnny H. Hoang
(74) *Attorney, Agent, or Firm*—Kenyon & Kenyon

(57) ABSTRACT

An ignition control device for controlling a coil device for an internal combustion engine, having a speed measuring device for measuring the speed of the internal combustion engine at a measuring time point within the ignition segment of a specific cylinder; an evaluating device for determining a preestablished ignition angle corresponding to the measured speed, a preestablished charging time corresponding to the measured speed, and a corresponding initial charging angle; an ignition-control-value output device for outputting to the coil device the initial charging angle and the charging time in a charging-time output mode, and the initial charging angle and the ignition angle in an ignition-angle output mode; an error estimating device for estimating an error of the ignition angle in the charging-time output mode and/or an error of the charging time in the ignition-angle output mode, on the basis of a possible speed change after the measuring time point; and an ignition control mode determining device for determining an ignition control mode from the ignition-angle output and charging-time output modes for the ignition segment based on the estimated error.

9 Claims, 2 Drawing Sheets

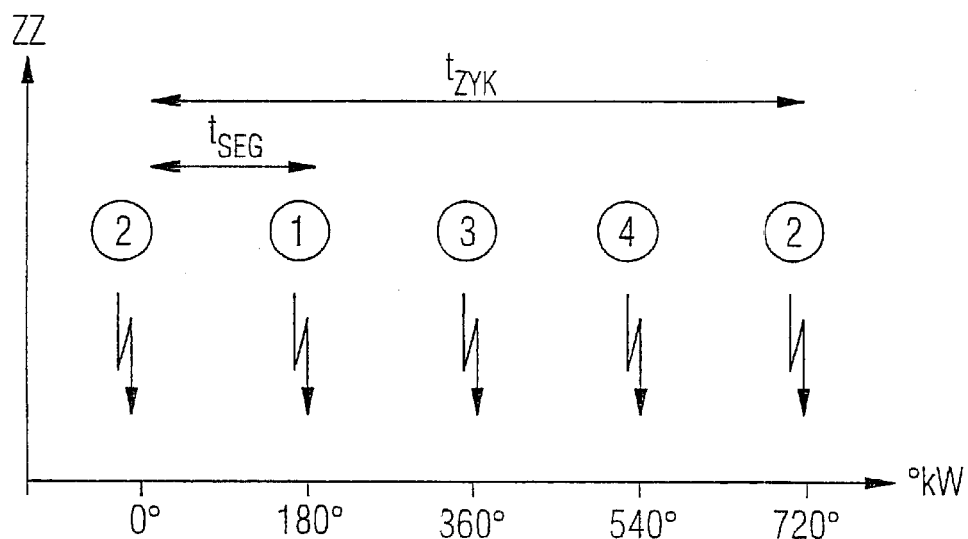
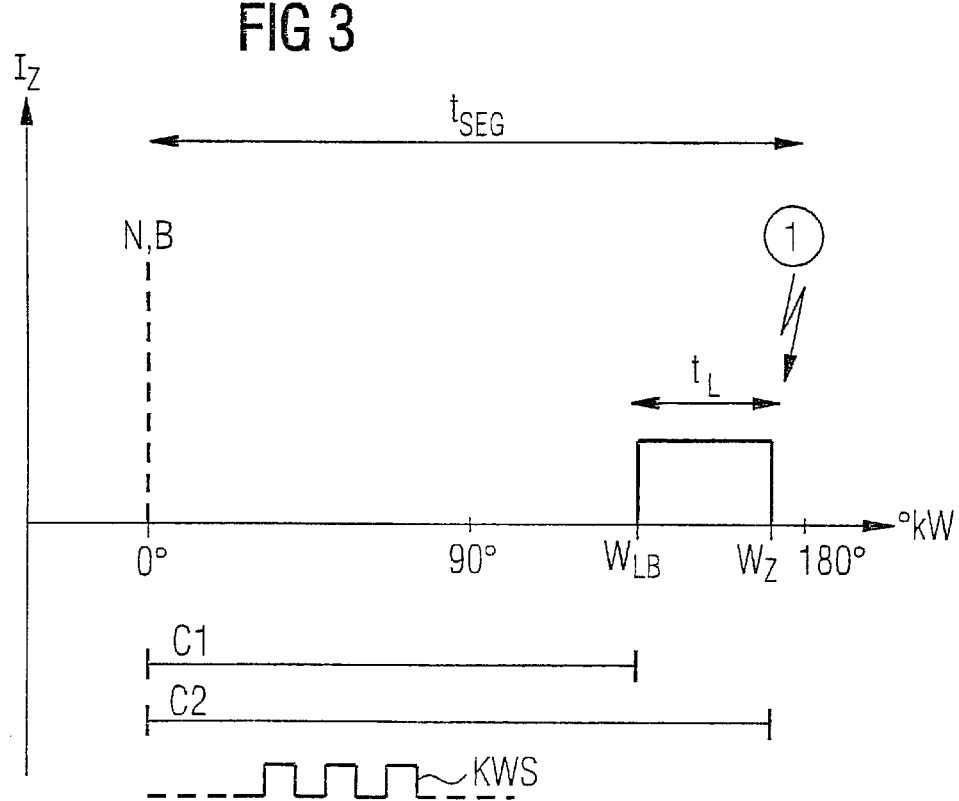

IGNITION CONTROL DEVICE AND METHOD

FIELD OF THE INVENTION

The present invention relates to an ignition control device as well as to a corresponding ignition control method.

BACKGROUND INFORMATION

Although applicable to any ignition control devices, the present invention as well as the problem underlying in are discussed with reference to an engine control device on board a motor vehicle.

Ignition control devices for controlling ignition events for coil ignition systems and devices essentially have two control functions, the controlling of a desired ignition energy over the duration of operation, i.e., the charging period of the coil, as well as the angle-correct controlling of an ignition pulse beyond the switch-off time point, i.e., the end of the coil charging.

In the case of coil ignition systems, the ignition energy that is measured over a charging time of the coil is of varying durations, in accordance with the electrical system voltage applied to the electrical switching circuit of the coil as well as with the time constants of the electrical switching circuit.

Usually, the specific setpoint values are stored as a characteristics field in the control unit, as a function of the speed and possible further engine parameters.

When a speed dynamic arises, the setpoint values, "charging time" and "ignition angle," generate a conflict in goals. The angular position at the commencement of the charging phase, i.e., the initial dwell angle, must be selected such that, after the termination of the charging time, the ignition angle is achieved. This means that at the time point of the calculation of the ignition events, the time-angle curve of the crankshaft motion must already be known.

In the event of an extreme speed dynamic and low-frequency speed readout, especially during engine startup, a non-negligible estimation error of this time-angle curve arises in conventional ignition control devices.

For generating angular signals, conventional control units have at their disposal an angle transmitter wheel, which supplies to the ignition control device pulses that are equidistant in their angle. However, for reasons relating to the computing run-time, the calculation of the ignition events in most ignition control device architectures only takes place segment by segment, one segment being the angular interval of 720° of the crankshaft divided by the number of cylinders, i.e., in a four-cylinder engine, for example, 180°. Therefore, although the angular positions of the ignition events, ascertained in the calculation, are measured with sufficient precision by the angle transmitter wheel and by the timer/counter circuits customary in ignition control devices, nevertheless the calculation itself proceeds on the basis of a measured speed, which, given the speed dynamic at the site of the ignition, is no longer valid.

To explain the problem, FIG. 1 depicts a schematic representation of the ignition sequence in a four-cylinder internal combustion engine.

In FIG. 2, crankshaft angle KW is plotted in ° on the X axis and ignition curve ZZ is plotted on the Y axis, the ignition curve having the sequence . . . -2-1-3-4-2- . . . The complete cycle amounts to 720° KW corresponding to a cycle time $t_{ZYK}$. One segment amounts to 720° KW/4=180° corresponding to one segment time $t_{SEG}$.

FIG. 3 depicts a schematic representation of the ignition control functional sequences in the segment of the first cylinder of the four-cylinder internal combustion engine with respect to the driving of coil current $I_Z$.

At 0°, speed N is measured and immediately thereafter charging time $t_L$ and ignition angle $w_Z$ (approximately equal to the final dwell angle) are derived from a characteristics field B.

Subsequently, the initial dwell or charging angle $w_{LB}$ is determined from the equation $$W_{LB}=W_Z-t_L\cdot\omega$$

assuming a uniform motion, $\omega$ being the angular velocity corresponding to speed N. For reasons having to do with the computing run-time, this temporal and angular position of the ignition events is calculated only once every ignition interval.

In the case of the charging-time output mode, angle $w_{LB}$ is measured by a counter C1 starting from 0°, using crankshaft sensor signal KWS, and when angle $W_{LB}$ is reached, the driver stage of the coil is triggered. Charging-time duration $t_L$ is controlled using a timer and, after the elapsing of charging-time duration $t_L$, the triggering is interrupted.

In the case of the ignition-angle output mode, angle $w_{LB}$ is measured by a counter C1 starting from 0°, using crankshaft sensor signal KWS, and when angle $W_{LB}$ is reached, the driver stage of the coil is triggered. Using a further counter C2, starting from 0°, angle $w_Z$ is measured using crankshaft sensor signal KWS, and when angle $w_Z$ is reached, the triggering is interrupted.

Since the erroneous calculation of the speed curve, e.g., in the case of engine startup, is not negligible, a prioritization of the control aims, charging time and ignition angle, is usually undertaken in ignition control devices. If the emphasis is on the exact output of the charging time—so-called charging-time output mode—using the timer/counter circuit, then in response to the startup acceleration (speed increase), a retard shift of the ignition angle results. On the other hand, if the ignition angle is precisely read out—so-called ignition-angle output mode—, then the charging time diminishes in response to the startup dynamic and thus the energy in the coil as well, which can lead to misfiring.

Therefore, usually the output method, i.e., charging-time output or ignition-angle output, is permanently preestablished as a function of the characteristics of the targeted system, or a switchover of the output method takes place in response to a threshold speed. In this context, a charging-time output is usual during startup, and a switchover to ignition-angle output is usual beginning from a threshold speed, at which the speed readout reaches such high frequency levels that the dynamic error is negligible, beginning from which, on the other hand, the sensitivity of the torque over the ignition angle falls off steeply.

An automatic selection of the output method via a generally valid calculation specification, which the output method independently determines during the calculation time from the current physical conditions, is therefore desirable.

SUMMARY OF THE INVENTION

In contrast to the known solutions, the ignition control device according to the present invention and the corresponding ignition control method have the advantage that a selection of the ignition method is carried out that corresponds to the current physical conditions of the ignition control device. In other words, an expedient model-specific representation is provided, within the ignition control device, of the physical correlations of significance for the coil ignition. In this manner, the operating mode most favorable for the ignition control device and for the relevant engine can be selected, without expensive applications.

This is advantageous in the case of ignition control devices that do not permit a clear prioritization of the output methods, charging-time output and ignition-angle output. The use of ignition units, i.e., coils and ignition devices, having moderate charging times and their installation on the cylinder head, which under certain circumstances is hot, results here in greater degrees of freedom. In addition, the present invention makes it easier to apply the ignition control device because the mode selection is automatically determined from the current physical conditions. Accommodation to the requirements of various areas of use is therefore significantly simpler.

The idea underlying the present invention is that an estimate of an error of the ignition angle in the charging-time output mode and/or an error of the charging time in the ignition-angle output mode is carried out on the basis of a possible speed change after the recording time point. Based on the estimated error, e.g., when a threshold value is exceeded, a determination of the ignition control mode takes place from the modes, ignition-angle output and charging-time output, for the ignition segment.

Preferably, the ignition angle error in the time output mode is estimated and, on the basis of this estimation, it is decided whether the ignition-angle output or charging-time output mode is selected. In other words, the ignition control device independently decides whether the supposed output error is still tolerable.

According to one preferred refinement, the error estimating device is configured such that it estimates a shift of the ignition angle in the charging-time output mode, and the ignition control mode evaluation device selects the ignition-angle output mode if the estimated shift exceeds a preestablished threshold value.

According to a further preferred refinement, the error estimating device has a speed measurement error estimating device for estimating the speed measurement error taking into account the speed and/or the change over time in the speed; a weighting device for weighting the estimated speed measurement error on the basis of the determined charging time; and a correction device for ascertaining a correction corresponding to a possible speed change between the measuring time point and the initial charging time point, corresponding to the initial charging angle.

According to a further preferred refinement, the error estimating device has a temperature measuring device for measuring the engine temperature, and a characteristic curve device for indicating an estimated value for the shift, on the basis of the measured engine temperature.

BRIEF DESCRIPTION OF THE DRAWING

FIG. 2 depicts a schematic representation of the ignition sequence in a four-cylinder internal combustion engine.

FIG. 3 depicts a schematic representation of the ignition control functional sequences in the segment of the first cylinder of the four-cylinder internal combustion engine.

DETAILED DESCRIPTION

Figure 1:
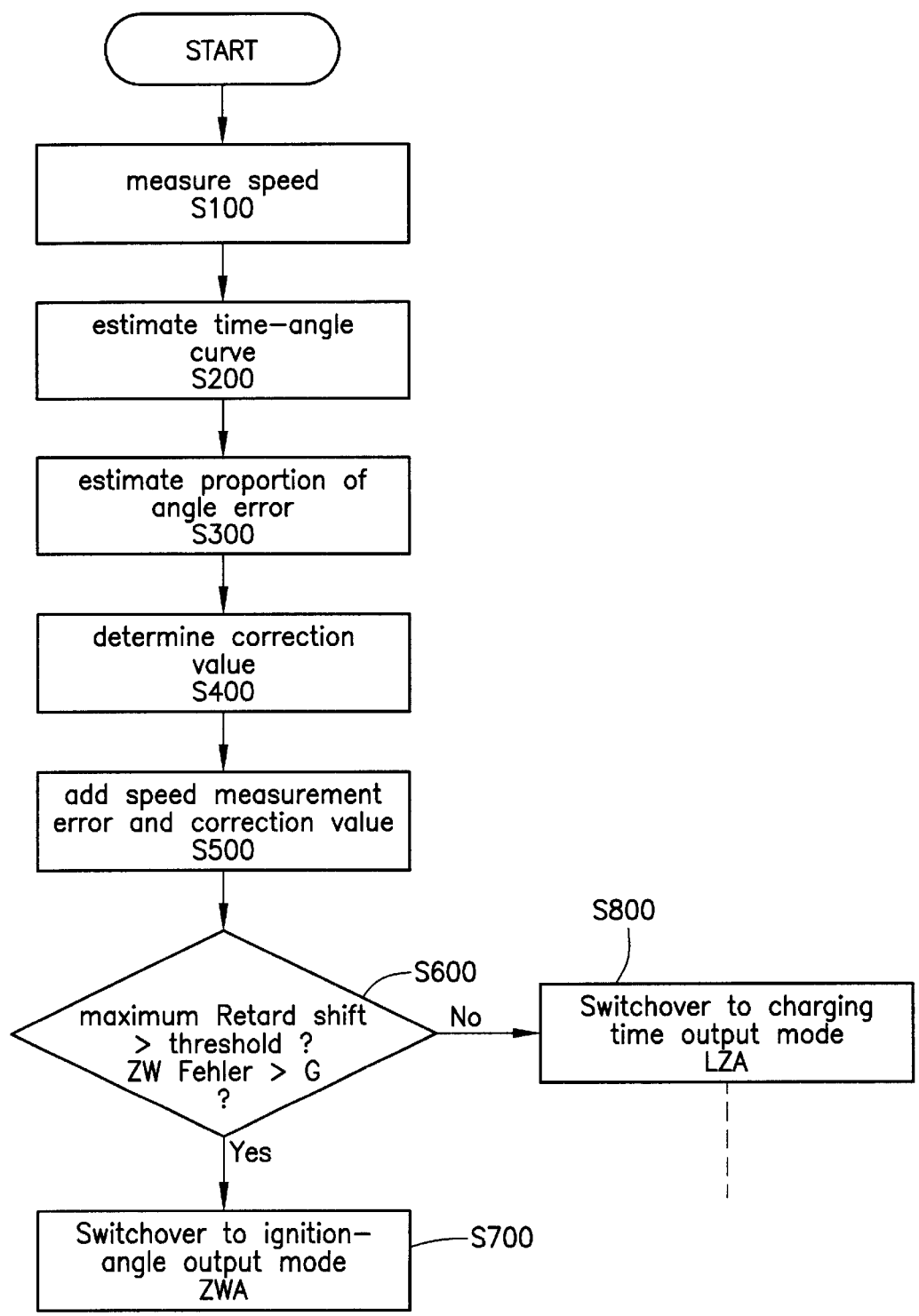
FIG. 1 depicts a flowchart for explaining one exemplary embodiment of the present invention.

In the Figures, the same reference numerals designate the same or functionally equivalent elements.

FIG. 1 depicts a flowchart for explaining one exemplary embodiment of the present invention. In this exemplary embodiment, the following procedures are proposed.

First, at step 100, a measurement, i.e., the recording of speed N, takes place, by analogy to the manner depicted in FIG. 3, at the beginning of the segment of the cylinder in question. In this context, the speed information for the estimations of the time-angle curve required in the ignition output are usually available as a time specification over an angle interval.

The measuring quality of the measured time-angle curve is estimated in step S200 via a threshold value comparison of speed N and the first temporal derivation of speed curve $dN/dt$ at the measuring time point. The smaller the base speed and the greater the acceleration beginning from this speed, the more imprecise the time-angle measurement of the ignition control device. The threshold value comparison supplies an estimate for the absolute speed measurement error. The threshold value, the speed, and speed derivation, or change, provide an evaluation of the measuring quality and thus of the control quality.

The estimated absolute speed measurement error is weighted using setpoint charging time $t_L$. In this manner, the proportion of the angle error that arises as a result of the faulty measurement of the speed is estimated in step S300.

From the angle interval between the beginning of the segment and ignition angle $w_Z$, in step S400, a correction value is calculated, which corresponds to the dynamic error that arises as a result of the speed increase from the beginning of segment to the beginning of charging $w_{LB}$.

The speed measurement error, weighted using dwell time or setpoint charging time $t_L$, i.e., the angle error and the correction value are added in step S500. In this manner, an estimate for the maximum retard shift in the charging-time output mode is obtained.

Below, a concrete example is presented for the numerical estimation of the ignition angle error in the charging-time output mode. In this context, for the shape of motion between two segments, a constant acceleration is assumed, in a good approximation.

The deviation of the ignition angle in the charging-time output is therefore yielded as follows;

$$zwout_{real} = zwout + szout \cdot (nmot_{actual} - nmot_{sg}) + a \cdot t_{beginning\ of\ charching} \cdot szout + \tfrac{1}{2} szout^2$$

$zwout_{real}$ being the actually read-out ignition angle given a constant acceleration (the angle relates to the position at the event calculation), $zwout$ being the setpoint ignition angle with reference to the position at the event calculation, $szout$ being the charging time, $nmot_{actual}$ being the actual speed in the ignition event calculation, $nmot_{sg}$ being the speed information of the control device (as a result of averaging over a measuring angle interval, the measuring speed is smaller than the actual speed), in this context, for example, $f(nmot_{sg}, dn)$ being able to be given as a characteristics field, $dn$ being the speed change since the last measurement, $a$ being the acceleration ($f(dn)$), $t_{beginning\ of\ charching}$ being the time from the event calculation to the beginning of the charging phase ($f(swout, zwout) * tseg$), $swout$ being the supposed dwell angle, i.e., $swout = szout/tseg \cdot segment\ angle$, and tseg being the segment time, i.e., the time for the angle interval 720° crankshaft divided by the number of cylinders.

The estimated readout error of the ignition-angle output is therefore yielded in accordance with $$zwfehler = zwout_{real} - zwout.$$

If the maximum retard shift in the charging-time output mode exceeds a preestablished threshold value, then a switchover to ignition-angle output mode ZWA is undertaken at S700, otherwise to charging-time output mode LZA at S800. This decision S600 should be carried out before the second ignition after the start-up, because the dynamic error is the greatest there.

In the further course, ignition-angle output mode ZWA can be maintained, or, in response to undershooting the threshold value, a return to charging-time output mode LZA can be effected. In addition, further criteria, e.g., reaching a given speed, etc., can be built in for the mode decision.

In the charging-time output mode, as was discussed above with reference to FIG. 3, after the initial charging angle has been reached, the charging time is allowed to expire and, given a precise maintenance of the setpoint energy in the coil, ignition is triggered. As a result, sufficient energy is guaranteed at a minimal loss of power. At lower speeds and at a greater acceleration, the ignition angle is shifted towards retard as a function of the dwell time and as a function of the position of the setpoint ignition angle. Therefore, in the application of the ignition angle at a speed in the order of magnitude of the startup speed, a dynamic derivative action is advantageously added in the direction of advancing.

In the ignition-angle output mode, as was discussed above with reference to FIG. 3, the ignition angle is measured without reference to the initial charging angle. In response to acceleration, ignition is triggered before the charging time elapses. Here, in the application given high acceleration and low speed, a dynamic derivative action is advantageously applied to the charging time in the direction of advancing.

Although the present invention has been described above on the basis of preferred exemplary embodiments, it is not limited thereto but rather can be modified in a multiplicity of ways.

Optionally, the maximum retard shift in the charging-time output mode can also be estimated via a characteristic curve with respect to the engine temperature, since in response to an ignition application in the start-up, the ignition angles remain approximately constant during the run-up and, in accordance with the temperature, the acceleration of the engine proceeds more or less in the same way. This characteristic curve has the shape zwfehler f(tmot).

The potential maximum ignition angle error should then be calculated offline for given setpoint ignition angles and setpoint dwell times, and on the basis of the acceleration measured at the temperature plus a possible dispersion. For this purpose, the run-up performance of the engine in terms of the speed is to be permanently reproducible under conditions of aging, as well.

What is claimed is:

1. An ignition control device for controlling a coil device for an internal combustion engine, comprising:
   a speed measuring device for measuring a speed of the internal combustion engine at a measuring time point within an ignition cycle of a specific cylinder;
   an angle measuring device for measuring a current crank angle of the internal combustion engine;
   a determining device for determining a preestablished ignition angle corresponding to the measured speed, a preestablished charging time corresponding to a measured battery voltage, and a corresponding initial charging angle;
   an ignition-control-value output device for outputting the preestablished charging time of the coil device, commencing from the initial charging angle, by adding to the preestablished charging time in a charging-time output mode, and by counting a charging angle until an ignition event in an ignition-angle output mode;
   an error estimating device for estimating an error corresponding to at least one of an error of the preestablished ignition angle in the charging-time output mode and an error of the preestablished charging time in the ignition-angle output mode on the basis of a possible speed change after a recording time point; and
   an ignition-control-mode determining device for determining an ignition control mode from the ignition-angle output mode and the charging-time output mode, for an ignition segment, based on the estimated error.

2. The ignition control device according to claim 1, wherein:
   the error estimating device estimates a shift of the preestablished ignition angle in the charging-time output mode, and
   the ignition-control-mode determining device determines the ignition-angle output mode if the estimated shift exceeds a predetermined threshold value.

3. The ignition control device according to claim 1, wherein the error estimating device includes:
   a speed measurement error estimating device for estimating a speed measurement error, taking into account at least one of the speed and a change over time of the speed;
   a weighting device for weighting the estimated speed measurement error on the basis of the determined preestablished charging time; and
   a correction device for determining a correction in accordance with the possible speed change between the measuring time point and an initial charging time point, corresponding to the initial charging angle.

4. The ignition control device according to claim 2, wherein the error estimating device includes:
   a temperature measuring device for measuring an engine temperature; and
   a characteristic curve device for indicating an estimating value for the shift, based on the measured engine temperature.

5. An ignition control method for controlling a coil device for an internal combustion engine, comprising the steps of:
   measuring a speed of the internal combustion engine at a measuring time point within an ignition segment of a specific cylinder;
   determining a preselected ignition angle corresponding to the measured speed, a predetermined charging time corresponding to the measured speed, and a corresponding initial charging angle;
   outputting to the coil device the initial charging angle and the predetermined charging time in a charging-time output mode, and the initial charging angle and the preselected ignition angle in an ignition-angle output mode;
   estimating an error corresponding to at least one of an error of the preselected ignition angle in the charging-time output mode and an error of the predetermined charging time in the ignition-angle output mode on the basis of a possible speed change after the measuring time point; and selecting an ignition control mode from the ignition-angle output mode and the charging-time output mode for the ignition segment based on the estimated error.

6. The method according to claim 5, wherein:

the error is estimated via an averaged speed change that is weighted using a dwell time.

7. The method according to claim 5, wherein:

an initial charging time is estimated from a current angular speed.

8. The method according to claim 5, wherein:

a predetermined temporal development of the speed is assumed for the estimation.

9. The method according to claim 8, wherein:

the predetermined temporal development corresponds to a constant acceleration.

* * * * *